April 23, 1929. W. M. S. LINDSEY 1,710,629
NUTCRACKER
Filed April 13, 1927 2 Sheets-Sheet 2

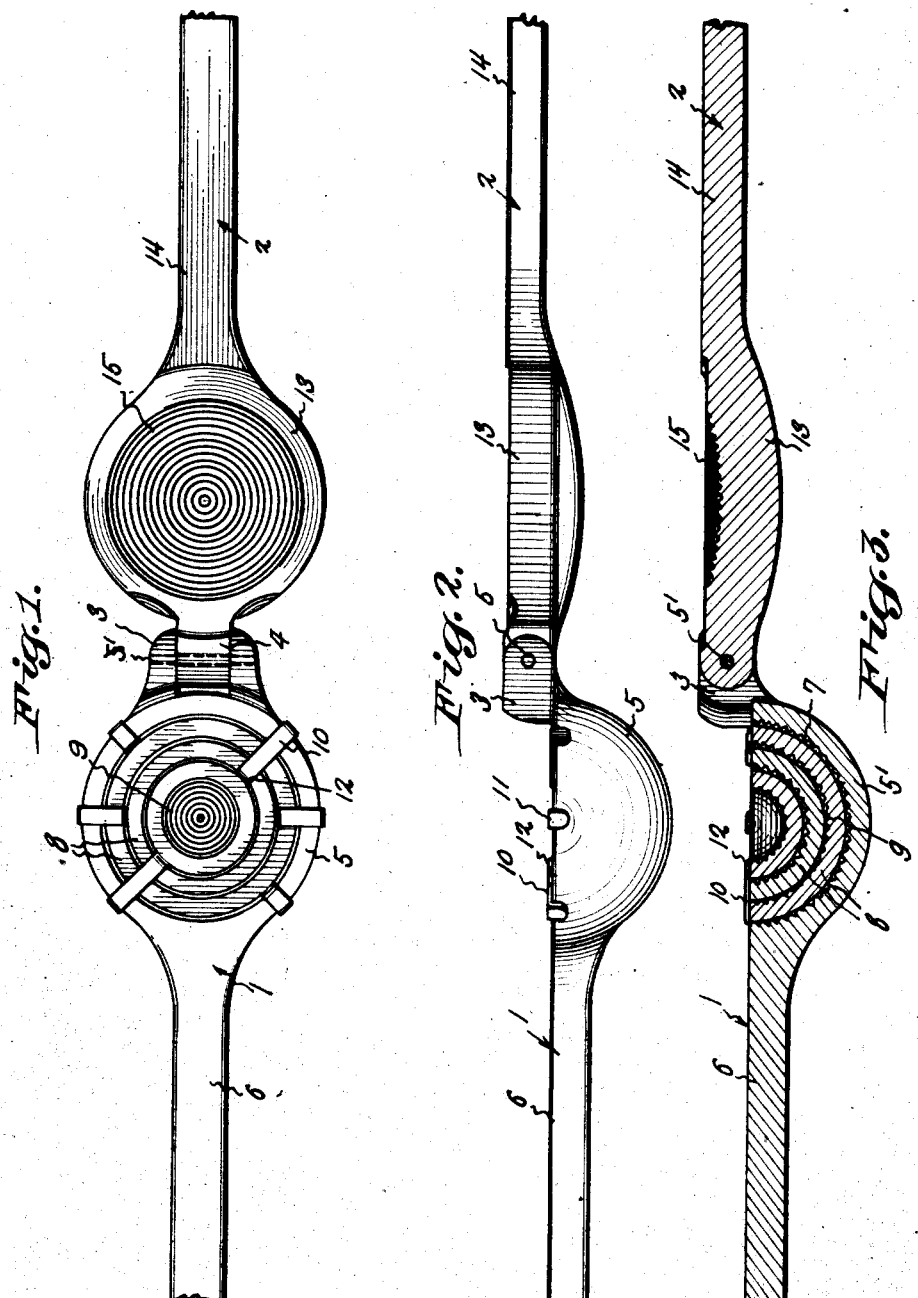

William M. S. Lindsey, Inventor

Witnesses

Patented Apr. 23, 1929.

1,710,629

UNITED STATES PATENT OFFICE.

WILLIAM M. S. LINDSEY, OF HOT SPRINGS, SOUTH DAKOTA.

NUTCRACKER.

Application filed April 13, 1927. Serial No. 183,485.

This invention relates to improvements in nut crackers and has as its general object to provide a nut cracker which will be so constructed as to overcome certain disadvantages which are present in and attend the use of nut crackers as ordinarily constructed.

The ordinary nut cracker comprises a pair of pivoted members having jaw portions and handles, but the jaw portions are relatively narrow and in the use of the devices, where the nuts to be cracked are of the larger sizes, the pieces of shell and kernels are liable to be scattered unless one hand is held about the nut cracker and the nut being cracked by the use thereof. Furthermore, due to the narrowness of the jaws, it is difficult to completely crack English walnuts and black walnuts, and other nuts of large size. Therefore it is an object of the present invention to provide a nut cracker so constructed that in a moment's time it may be arranged so as to be employed in cracking nuts of any size with equal efficiency.

Another object of the invention is to so construct the jaws of the nut cracker that nuts disposed between the jaws will not be liable to be displaced when the jaws are brought together but will on the other hand remain in the position in which they are initially placed.

In the accompanying drawings:

Fig. 1 is a plan view of the nut cracker embodying the invention, the pivoted members thereof being shown spread open;

Fig. 2 is a side elevation of the nut cracker with the members arranged as shown in Figure 1;

Fig. 3 is a vertical longitudinal sectional view through the nut cracker with the members arranged as shown in Figure 2;

Figure 4:
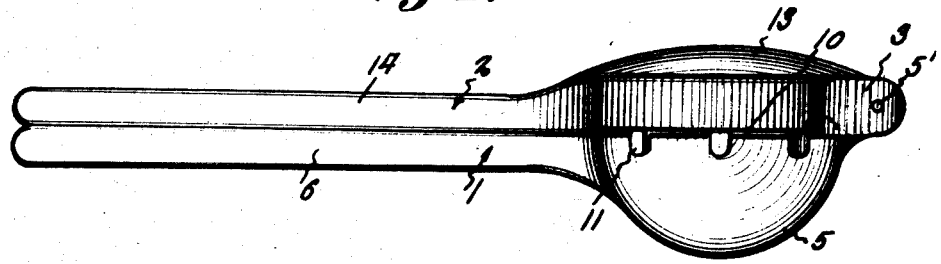
Fig. 4 is a side elevation of the nut cracker with the pivoted members thereof closed.
Figure 5:
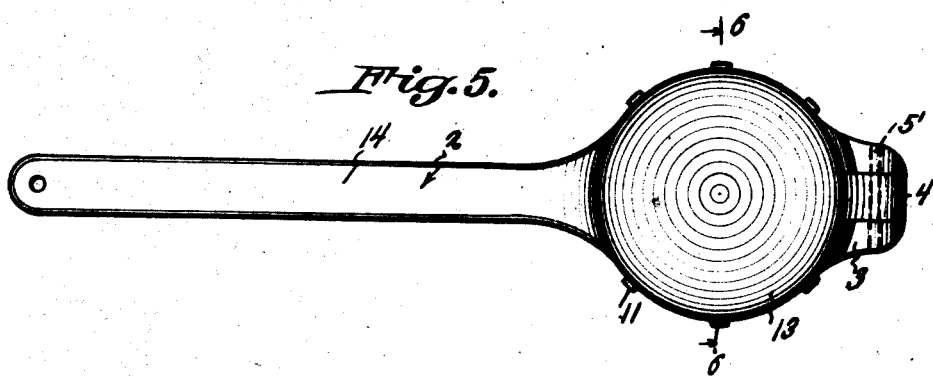
Fig. 5 is a plan view of the nut cracker with the members closed.

The device embodying the invention consists essentially of a pair of pivoted lever members one of which is indicated in general by the numeral 1 and the other in general by the numeral 2, the member 1 being provided at one end with a pair of spaced ears 3 accommodating between them an ear 4 which is formed at the corresponding end of the member 2, a pivot pin 5' being fitted through the said ears so as to pivotally connect the members.

Figure 6:
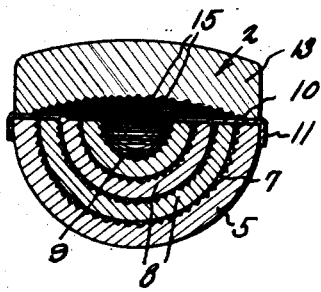
Fig. 6 is a vertical transverse sectional view taken substantially on the line 6—6 of Figure 5 looking in the direction indicated by the arrows.
Figure 7:
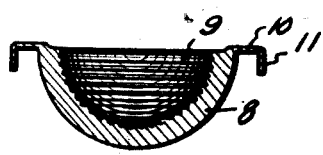
Fig. 7 is a diametric sectional view through one of the interchangeable jaw elements of the device.

The member 1 comprises a jaw 5 which in itself is of substantially hollow semi-spherical form and it is upon one side of this head that the ears 3 are formed, the ears being offset in an upward direction as best shown in Figures 2 and 3 of the drawings. A handle 6 extends from the other side of the jaw 5 and may be of any desired contour. As illustrated in Figures 3 and 6 of the drawings, the jaw 5 is formed upon its inner or concave side with a member of concentric annular ribs indicated by the numeral 7, these ribs or corrugations being relatively shallow and preferably of gradually decreasing thickness in cross section in the direction of their edges. In practice the jaw 5 will have an internal diameter such as to adapt the jaw to receive nuts of larger sizes such for example as English and black walnuts, Brazil nuts, etc. In order that the nut cracker may accommodate nuts of medium and the smaller sizes, a plurality of jaw members 8 of progressively decreasing diameter with respect to one another, are arranged in nested form within the jaw 5. The jaw members 8 are of hollow semi-spherical form and each is exteriorly smooth and provided upon its inner or concave surface with a plurality of concentric annular ribs 9 corresponding to the ribs 7 upon the inner surface of the jaw 5. It will be observed by reference to Figures 3 and 6 of the drawings that when all of the jaw members 8 are assembled in nested relation within the jaw 5, the rims of all of the members will occupy a common plane which is the plane defined by the rim of the jaw 5, the said rim of the jaw and the adjacent portion of the handle 6, at this side of the jaw, being flat. It will likewise be observed by reference to Figures 3 and 6 of the drawings that when the sections or members 8 are nested the smooth convex surfaces of the sections will contact the ribbed concave surfaces of the next adjacent sections. It will likewise be observed that inasmuch as the sections are of relatively smaller diameters, by employing one or more of the sections or members, the nut cracker may be adapted to receive and retain nuts of different sizes.

In order that the members 8 may be retained in place after the assemblage of the member of largest diameter with the jaw 5 or this member and the members of smaller diameters in assembly with the said jaw and the larger members, each member 8 is provided at its rim with a pair of radially extending fingers 10 having downturned ends 11 which are adapted to be engaged frictionally with the outer side of the jaw 5 at the rim thereof. These fingers 10 are preferably diametrically oppositely located and in order that the fingers may extend over the rim of the jaw 5 and over the rims of the members 8 which they must span in order to coact with the rim of the member 5, each finger is slightly offset in an upward direction at its juncture with the rim of the respective member 8 as indicated by the numeral 12, this offset being merely sufficient to bring the under side of each finger into the plane occupied by the rims of the several members 8 and the jaw 5 when the members are assembled. It will be observed by reference to Figure 1 that the fingers upon the member 8 which is disposed directly within the jaw 5 and which is the member of greatest diameter, directly engage the rim of the jaw 5, the fingers upon the other members 8 being formed longer so as to span the rims of the members 8 within which they are concentrically arranged. It will now be understood that in using the device in cracking nuts of the larger size, none of the members 8 will be employed but that for medium size nuts and nuts of smaller sizes, one or more of the members will be arranged in place in accordance with the average size of the nuts to be cracked.

The member 2 of the nut cracker likewise comprises a jaw which is indicated by the numeral 13 and a handle indicated by the numeral 14, and the jaw 13 of this member, while of circular form and substantially the same diameter as the jaw 5 of the member 1, is preferably of comparatively shallow concavo-convex form, the concave side of the jaw 13 being formed with a number of concentric ribs 15 corresponding to the ribs 7 of the jaw 5 and the ribs 9 of the members 8. The centers of the jaw 5 and of the jaw 13 are equi-distantly spaced with respect to the pivot 5' for the members 1 and 2 so that when the member 2 is swung upwardly and in the direction of the member 1 to position its jaw 13 above the jaw 5 and the handle members are brought together to cause the jaw to exert pressure against the nut to be cracked, the axes of the two jaws will be in alinement, and due to the concave formation of the jaw 5 and the several members 8 and the slightly concave form of the active face of the jaw 13, there will be no likelihood of dislodgment of a nut disposed upon the jaw of the member 1 regardless of the size of the nut. Furthermore there will be no likelihood of pieces of the shell and of the kernel being scattered in all directions when the nut is crushed.

It is to be understood, of course, that various changes may be made, within the scope of what is claimed, without departing from the spirit of the invention.

Having thus described my invention, what I claim is:

1. A nut cracking device comprising a pair of pivotally connected members including coacting jaws and handles extending therefrom, one of said jaws having a concave nut supporting face, the said face being formed with annular corrugations.

2. A nut cracking device comprising a pair of pivotally connected members including coacting jaws and handles extending therefrom, one of said jaws having a concave nut supporting face, and a concavo-convex jaw member disposed in nested position within the concavity of the face of the said jaw and having a concave nut supporting face of less diameter than the corresponding face of the said jaw.

3. A nut cracking device comprising a pair of pivotally connected members including coacting jaws and handles extending therefrom, one of said jaws having a concave nut supporting face, and a concavo-convex jaw member disposed in nested position within the concavity of the face of the said jaw and having a concave nut supporting face of less diameter than the corresponding face of the said jaw, the said nut supporting face of the said nested jaw member having concentric corrugations.

4. A nut cracking device comprising a pair of pivotally connected members including coacting jaws and handles extending therefrom, one of said jaws having a concave nut supporting face, and a concavo-convex jaw member disposed in nested position within the concavity of the face of the said jaw and having a concave nut supporting face of less diameter than the corresponding face of the said jaw, the said nut supporting face of the said nested jaw member having concentric corrugations, and means for holding the said member assembled with the said jaw.

5. A nut cracking device comprising a pair of pivotally connected members including coacting jaws and handles extending therefrom, one of said jaws having a concave nut supporting face, and a plurality of concavo-convex jaw members of progressively different diameters disposed in nested relation in the concavity of the said jaw.

6. A nut cracking device comprising a pair of pivotally connected members including coacting jaws and handles extending therefrom, one of said jaws having a concave nut supporting face, and a plurality of concavo-convex jaw members of progressively different diameters disposed in nested relation in the concavity of the said jaw, the concave face of the jaw and the concave faces of the jaw members being provided each with a plurality of concentric corrugations.

7. A nut cracking device comprising a pair of pivotally connected members including coacting jaws and handles extending therefrom, one of said jaws having a concave nut supporting face, and a plurality of concavo-convex jaw members of progressively different diameters disposed in nested relation in the concavity of the said jaw, and means carried by each of said jaw members for coaction with the rim of the said jaw for retaining the member in place.

8. A nut cracking device comprising a pair of pivotally connected members including coacting jaws and handles extending therefrom, one of said jaws having a concave nut supporting face, and a plurality of concavo-convex jaws members of progressively different diameters disposed in nested relation in the concavity of the said jaw, and fingers radiating from each of the jaw members and having terminal portions for frictional engagement with the rim of said jaw with which the members are assembled.

In testimony whereof I affix my signature.

WILLIAM M. S. LINDSEY.